July 12, 1966  A. B. NEWTON  3,260,064
AIR CONDITIONING SYSTEM WITH IMPROVED HUMIDITY CONTROL
Original Filed May 3, 1961

INVENTOR.
ALWIN B. NEWTON
BY
ATTORNEY.

United States Patent Office 3,260,064
Patented July 12, 1966

3,260,064
AIR CONDITIONING SYSTEM WITH IMPROVED HUMIDITY CONTROL
Alwin B. Newton, Spring Garden Township, York County, Pa., assignor to Borg-Warner Corporation, Chicago, Ill., a corporation of Illinois
Continuation of application Ser. No. 107,486, May 3, 1961. This application June 9, 1964, Ser. No. 375,418
4 Claims. (Cl. 62—209)

This application is a continuation of Serial No. 107,486, filed May 3, 1961, now abandoned.

This invention relates to refrigerating systems and, more particularly, to an improved air conditioning system providing for improved humidity control.

The system finds its prime use in small air conditioning systems, whether stationary or mobile, where humidity control is important and not ordinarily provided, and also in various refrigeration applications, wherein humidity control may be important, such as, by way of example, the preservation of foodstuffs.

In the average air conditioning system, especially those of a smaller tonnage adapted for home or mobile use, very little humidity control is possible. Such systems are adapted to provide temperature control with any actual humidity control being incidental to the operation of the system. During such times of the year as the temperature is such as to satisfy the thermostatic requirements of the system, the system remains inoperative, even though the humidity may be extremely high. In order to obtain any semblance of humidity control under such circumstances, it would be necessary to drastically lower the operating temperature by way of its thermostatic control to thereby cool down the air below what would be a desirable temperature. In a refrigerating system, even this drastic lowering of temperature may not be effective or, in fact, might increase the humidity in the refrigerated space, since sensible heat might be removed more rapidly than latent heat, with a possible net increase in the relative humidity.

Applicant has devised a system which, in its broadest aspects, provides for both temperature control (sensible heat) and control of humidity (latent heat).

It is an object of the invention to provide a refrigerating system of the type utilizing a compressor, a condenser and an evaporator, and wherein constant pressure expansion valve means are provided at the inlet to said evaporator for reducing the pressure and corresponding temperature of hot refrigerant enroute from the condenser to the evaporator, and, at the same time, provide for a substantially constant pressure and consequent constant temperature in said evaporator, which pressure and temperature may be set low enough to provide essential dehumidification. In addition, the compressor is provided with capacity control means and operating means therefor responsive to the superheat of refrigerant gas leaving the evaporator, so that proper control may be afforded of the capacity of the system to regulate the same in order to take care of the sensible requirements. As the superheat increases, indicating a need for more capacity, the control means will cause the compressor to be loaded up to its maximum. A decrease in superheat causes the reverse effect. The net effect is that the capacity control means operates to maintain the desired superheat.

It is a further object to provide a refrigerating system of the type just above mentioned, wherein the constant pressure expansion valve means is made adjustable to vary the pressure and temperature at which the evaporator operates.

It will be apparent that on an extremely muggy, low temperature day, the constant pressure expansion valve means may then be adjusted to lower the temperature of the evaporator to provide better dehumidification. Some means would then necessarily be provided to insure that the pressure of the evaporator could never be lowered to correspond to a temperature such that a freeze-up or frost problem would be presented. It will be apparent further that some means need also be provided to insure that the pressure of the evaporator can never be raised to correspond to an evaporator temperature such that the superheat maintained would amount to less than a fixed amount, say two to three degrees. This is necessary to insure that there is no liquid slop-over from the evaporator to the compressor.

It is a further object of the invention to provide a refrigerating system of the type first above mentioned, wherein the operating means for the compressor capacity control means is made adjustable to vary the superheat maintained. If found necessary or desirable, the operating means may be adjusted so that a higher superheat is permitted before the control means acts to increase the capacity of the compressor. This would then have the effect of reducing the active portion of the coil. In effect, the coil side is controlled and the compressor capacity matched to the new size coil. The system is then balanced out to provide the desired sensible heat removing capabilities and latent heat removing capabilities.

Yet another object of the invention is to provide a system of the type first above mentioned, wherein both the pressure expansion valve means and the operating means for the capacity control means are made adjustable. It will be apparent that under this circumstance, if the pressure expansion valve means is adjusted to lower the operating temperature of the evaporator, the operating means may similarly be adjusted to maintain the same degree of superheat if such is found desirable. At the same time, either one may be adjusted independently of the other with the results as set out above.

Another object of the invention is to provide a system of the type just above mentioned, wherein the operating means for the capacity control means is made responsive to the differential in temperature between refrigerant entering the evaporator and leaving the evaporator (i.e., absolute superheat), so that changing the operating pressure and temperature of the evaporator would have no direct effect on the capacity control means, since the operating means therefor is always responsive to a fixed temperature difference across the coil, rather than the absolute temperature of the gas leaving the coil, as previously determined.

A further object of the invention is to provide a system of the type first above mentioned wherein a throttling valve of the type which maintains a constant temperature at the outlet of the evaporator is provided in the suction line to the compressor as a capacity control means. It will be apparent that in this type of system both the constant pressure valve and the throttling valve may be adjustable to provide for the varying needs and adjustments mentioned above.

From all the above, it will be obvious that the constant pressure valve setting determines the ratio of dehumidification, while the operating means combined with the capacity control means determines the total capacity. Either can be separately adjusted.

While the advantages of all the above will be obvious as applied to stationary systems, a further advantage accrues with respect to mobile systems in that, having established the coil capacity by the superheat setting, this capacity is maintained irrespective of varying speeds of the compressor prime mover and consequent varying compressor speeds.

The invention consists of the novel constructions, arrangements and devices to be hereinafter described and claimed for carrying out the above-stated objects and such other objects as will appear from the following description of a preferred embodiment of the invention described with reference to the accompanying drawings, in which:

Like numerals refer to like parts throughout the several views.

Figure 1:
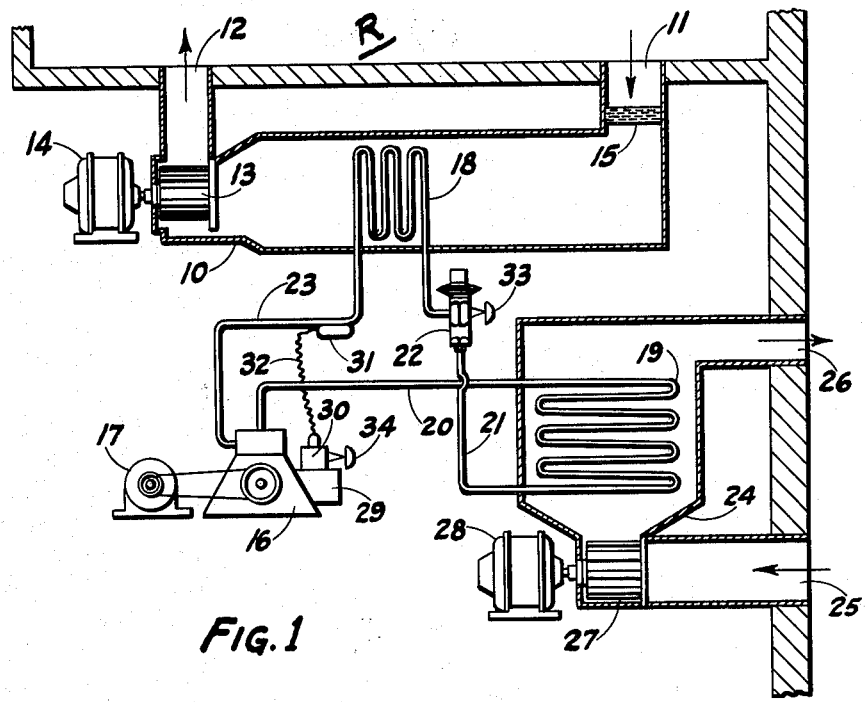
FIG. 1 is a schematic representation of an air conditioning system embodying the refrigerating system of the invention.

In the particular application shown, the refrigerating system is utilized for providing proper cooling and dehumidification of air to be supplied to an enclosure. This is in no sense to be taken as limiting, but rather must be understood to be used in an illustrative sense only. As was set out above, the refrigerating system of the invention finds particular application in mobile systems and also may be used for refrigerating duty, per se.

A duct 10 communicates with an enclosure "R" to be conditioned by way of an inlet 11 and an outlet 12. A fan 13, driven by a motor 14, is positioned to withdraw air from the enclosure "R" via inlet 11, and thence through duct 10, discharging through outlet 12 back into the enclosure. A filter 15 is positioned in inlet 11 for removing filterable impurities from the circulating air.

A refrigerating apparatus, according to the invention, is provided for cooling and dehumidifying the air passing through duct 10. The refrigerating apparatus includes a compressor 16, driven by a motor 17, an evaporator 18 located in duct 10, and a condenser 19. A hot gas line 20 connects the discharge of compressor 16 with condenser 19. A hot liquid line 21, having a constant pressure expansion valve 22 therein, connects the outlet of condenser 19 with the inlet of evaporator 18. Constant pressure expansion valve 22 may be of any type, for instance that shown in FIG. 10, page 27–10 of the 1957 Air Conditioning and Refrigerating Data Book published by the American Society of Refrigerating Engineers. Expansion valve 22 acts to maintain a constant evaporative pressure and corresponding temperature in evaporator 18. From evaporator 18 a cold gas line 23 leads back to the inlet of the compressor to complete the circuit. A duct 24 is provided with an inlet 25 and an outlet 26 communicating with the outside air space. Condenser 19 is located within duct 24 and a fan 27, driven by a motor 28, is provided and positioned to circulate outside air thereover.

It will be apparent that a secondary fluid may be utilized for removing the heat from the air in the enclosure to be cooled, in turn giving up the heat picked up to evaporator 18. It will also be apparent that any means or fluid may be utilized to remove the heat from condenser 19.

Compressor 16 is provided with a capacity controller 29, which may be of the type shown in the Newton Patent No. 2,761,616.

Means 30 are provided for operating capacity controller 29. Operating means 30 are actuated by the pressure of refrigerant fluid (or any suitable fluid which will develop the proper pressures at the temperature range considered) in a bulb 31 attached to the outlet of evaporator 18 and connected to operating means 30 by way of a capillary 32, all as is well known in the art. It will be appreciated that any suitable means may be provided for operating capacity controller 29 responsive to the superheat temperature of refrigerant gas leaving evaporator 18.

If found desirable, constant pressure expansion valve means 22 may be provided with an adjusting means 33. Similarly, operating means 30 may be provided with an adjusting means 34.

In operating the FIG. 1 system, motors 14, 17 and 28 are all put into operation by whatever suitable means are provided (not shown). Air to be cooled is then drawn from enclosure "R" through inlet 11, discharging its heat to evaporator 18, then returns to enclosure "R" by way of outlet 12. The refrigerating apparatus functions to pump the heat removed in evaporator 18 up to a sufficiently high pressure and temperature level so that it may be removed from the refrigerant in condenser 19 by the flow of outdoor air thereover, as is well known in the art. Operating means 30 is designed to maintain, say for example, three degrees of superheat in the refrigerant gas leaving evaporator 18. Constant pressure expansion valve 22 is designed to maintain a desired pressure and temperature in evaporator 18 sufficiently low to provide necessary dehumidification. Operating means 30 acts on capacity control 29 to reduce the capacity of compressor 16 on a decrease in superheat, and to load the compressor on an increase in superheat.

By way of example, on a typically mild but muggy day when very little sensible cooling is required but a great amount of dehumidification is required, evaporator 18, because of its sufficiently low pressure and temperature, acts to remove moisture from the room air passing thereover. At the same time, it will be appreciated that the superheat temperature of refrigerant gas leaving evaporator 18 under these circumstances, will be minimal. Operating means 30 will, therefore, act on capacity control means 29 to reduce the capacity of compressor 16 until such time as the desired capacity is reached under all the circumstances of the particular operation.

When the constant pressure expansion valve 22 is made adjustable, then the pressure and temperature obtaining in evaporator 18 may be varied to suit the particular circumstances at that time. On a mild, muggy day, it might perhaps be found desirable to lower the pressure and corresponding temperature of evaporator 18 so that greater dehumidification may be obtained. When constant pressure expansion valve 22 is made adjustable, some means must be provided to insure that the pressure and temperature may not be raised to a point providing for too low a superheat as sensed by bulb 31.

When operating means 30 is made adjustable, then it may be utilized to vary the degree of superheat which the compressor maintains. If the degree of superheat is raised (i.e. from three degrees to six degrees), then the total capacity of the system will be lowered, which would be desirable on mild but muggy days. On hot days, it would be found desirable to lower the degree of superheat permitted in order to obtain maximum capacity. It will be perceived that making operating means 30 adjustable, in effect gives a second method of controlling total capacity. Under the above conditions of operation, the coil outlet temperature (establishing the degree of superheat desired) is an indicator of the system capacity. Adjusting the operating means 30, in effect changes the temperature at which the operating means responds.

In those instances where both constant pressure expansion valve means 22 and operating means 30 are made and adjustable, then operating means 30 may be adjusted to maintain a constant superheat of the gas leaving evaporator 18 with varying adjustments of constant pressure expansion valve 22. It will be immediately obvious that far greater flexibility is obtained where constant pressure expansion valve 22 and operating means 30 are made adjustable to meet the varying circumstances under which the refrigerating system may be called to operate. However, in its simplest form, neither need be adjustable.

Figures 2, 3:
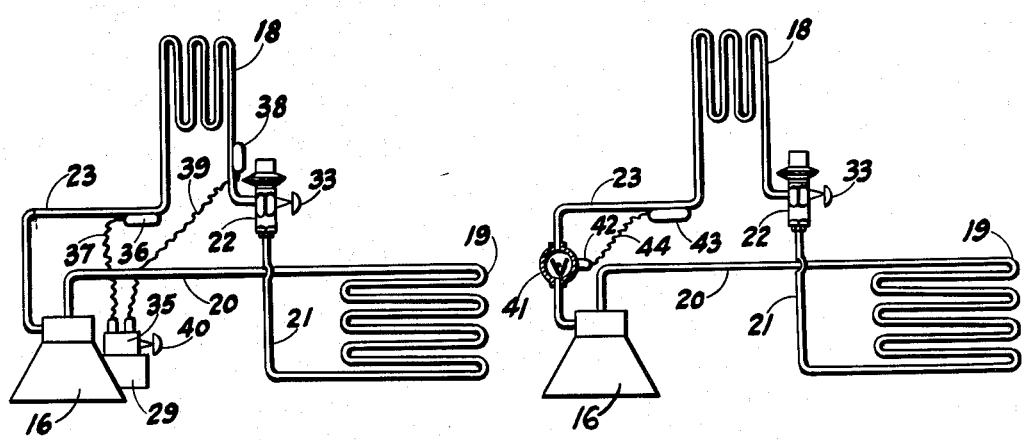
FIG. 2 is a schematic representation of a refrigerating system of a type similar to that shown in FIG. 1 but showing a modification thereof.
FIG. 3 is a schematic representation of a refrigerating system of a type similar to that shown in FIG. 1 and showing a second modification thereof.

The FIG. 2 system differs from the FIG. 1 system only in that a different type of operating means is provided for capacity controller 29, and takes the form of a differential controller means 35 for operating capacity controller 29. A bulb 36, filled with the usual pressure fluid, is located on the outlet of evaporator 18, and is connected to differential controller means 35 by way of a capillary 37. A second bulb 38, filled with fluid pressure means, is located on the inlet to evaporator 18 and is connected to differential controller means 35 by way of a capillary 39. Differential controller means 35 is also provided with adjusting means 40.

A typical differential controller means 35 could either be pneumatically operated or electrically operated. The pneumatic or electrical means of operation have not been shown, since such are well known and common in the art. A pneumatic differential controller could be of the type shown in Section 1, page 39, of the Minneapolis-Honeywell Control Manual, Copyright 1948, and designated Type L–0903. In the same control manual there is shown a typical electrically operated control in Section 1, page 9 thereof, and designated Type L–443.

In the operation of the FIG. 2 system, differential controller means 35 is responsive to the differential temperature across evaporator 18. If it is desired to maintain a constant three degree differential (i.e., superheat), then it can be seen that adjustment of constant pressure expansion valve 22 will have no effect on the operating means, so long as it is desired to maintain this constant three degree superheat. In effect then, the FIG. 2 system provides a means and method whereby variations in the operating pressure and temperature of the evaporator will have no effect on the operating means for the capacity controller, so long as it is not desired to change the amount of superheat permitted.

If it is desired to change the amount of superheat permitted, this may be accomplished by way of adjustment 40. Under this circumstance, since there is no change in the constant pressure valve setting, the capacity of the system can be changed by way of adjustment 40 without changing the ratio between the sensible and latent cooling capacity of the system. The change in capacity is effected since variants of the amount of superheat permitted in effect permits a greater or lesser utilization of the coil surface.

The FIG. 3 system differs from the FIG. 1 system only in that capacity control is provided for by a throttling valve means 41, located in the inlet to compressor 16. Means 42 is provided for operating throttling valve 41. A bulb 43, filled with the usual pressure fluid is located at the exit of evaporator 18, and is attached to operating means 42 by way of a capillary 44. The throttling valve 41 may be of the type shown in the application of Harter et al., Serial No. 16,554, now U.S. Patent No. 3,041,847, filed March 21, 1960, owned by the assignee of this invention, or any other suitable type. The operation of the FIG. 3 system will otherwise be identical to that shown in FIG. 1, except that throttling valve 41 acts to regulate the capacity of compressor 16 rather than capacity controller 29, as shown in FIG. 1. Again, as in FIG. 1, both constant pressure expansion valve 22 and throttling valve 41, or either one, may be adjustable with the same results as set out above. As in the FIG. 1 system, the adjusting of throttling valve 41, in effect changes the temperature at which the valve 41 responds.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:
1. In an air conditioning system for a space to be conditioned including a compressor, a condenser, an evaporator, and means connecting said components into a closed refrigerating circuit for circulating a refrigerant therethrough, said means comprising a hot gas line between said compressor and said condenser, a hot liquid line between said condenser and said evaporator, and a cold gas line between said evaporator and said compressor; the improvement comprising constant-pressure expansion valve means in said hot liquid line for reducing the pressure and corresponding temperature of hot refrigerant en route to the evaporator and for maintaining the pressure and corresponding temperature in said evaporator substantially constant; controll means for varying the capacity of said compressor; and operating means actuating said compressor capacity control means in response to the differential temperature between refrigerant entering said evaporator, i.e. absolute superheat, to maintain said superheat substantially constant.

2. In the system of claim 1, means rendering said constant-pressure expansion valve means adjustable to vary the pressure and corresponding temperature maintained in said evaporator.

3. In the system of claim 2, means rendering said operating means adjustable to vary the superheat maintained by said compressor capacity control means.

4. In the system of claim 1, means rendering said operating means adjustable to vary the superheat maintained by said compressor capacity control means.

References Cited by the Examiner
UNITED STATES PATENTS
1,325,128  12/1919  Wegner _____ 62—212 X MEYER PERLIN, *Primary Examiner.*